US012602765B2

(12) United States Patent　　(10) Patent No.: US 12,602,765 B2
Iwamoto et al.　　(45) Date of Patent: Apr. 14, 2026

(54) DEFECT INSPECTION SYSTEM AND DEFECT INSPECTION METHOD

(71) Applicant: Meinan Machinery Works, Inc., Aichi (JP)

(72) Inventors: Masamichi Iwamoto, Aichi (JP); Takehiko Tokuyama, Aichi (JP); Keijiro Yamaguchi, Aichi (JP); Masato Miura, Aichi (JP)

(73) Assignee: Meinan Machinery Works, Inc., Aichi (JP)

( * ) Notice: Subject to any disclaimer, the term of this patent is extended or adjusted under 35 U.S.C. 154(b) by 0 days.

(21) Appl. No.: 19/133,259

(22) PCT Filed: Sep. 3, 2024

(86) PCT No.: PCT/JP2024/031552
§ 371 (c)(1),
(2) Date: May 28, 2025

(87) PCT Pub. No.: WO2025/079367
PCT Pub. Date: Apr. 17, 2025

(65) Prior Publication Data

US 2026/0010996 A1　　Jan. 8, 2026

(30) Foreign Application Priority Data

Oct. 12, 2023　(JP) ................................. 2023-176670

(51) Int. Cl.
*G06T 7/00* (2017.01)
*G01N 21/88* (2006.01)
(Continued)

(52) U.S. Cl.
CPC ....... *G06T 7/0004* (2013.01); *G01N 21/8806* (2013.01); *G01N 21/8914* (2013.01);
(Continued)

(58) Field of Classification Search
CPC ..................... G06T 7/0004; G06T 7/50; G06T 2207/10024; G06T 2207/10028;
(Continued)

(56) References Cited

U.S. PATENT DOCUMENTS

2022/0051392 A1* 2/2022 Morita ............... G01N 21/8806

FOREIGN PATENT DOCUMENTS

JP　　H08145914 A　* 11/1994
JP　　2007040913 A　　2/2007
(Continued)

OTHER PUBLICATIONS

JP-2010008239-A English translation, JP-2010008239-A.*
(Continued)

*Primary Examiner* — Shahan Ur Rahaman
(74) *Attorney, Agent, or Firm* — POLSINELLI PC

(57) ABSTRACT

Images of a face surface and a back surface of a plywood 10 that is conveyed on belt conveyors 5U and 5D are captured by imaging devices of first illumination and imaging units 1F and 1B to generate depth information, a shape of the plywood 10 is measured by shape measurement units 3F and 3B, which are provided at locations different from a location of a gap 51 where the image capturing is performed, to generate shape information, and the depth information is corrected based on the shape information, and then a defect in the plywood 10 is detected based on the depth information. By detecting a defect in the plywood 10 based on the depth information corrected using the shape information that is measured without being affected by vibrations that occur when the plywood 10 is conveyed over the gap 51, a defect such as warpage or bending can be accurately detected without deformation occurring in the plywood 10 being flattened by the correction of the depth information.

11 Claims, 8 Drawing Sheets

(51) Int. Cl.

| | | |
|---|---|---|
| *G01N 21/89* | (2006.01) |
| *G06T 7/50* | (2017.01) |
| *H04N 23/56* | (2023.01) |
| *H04N 23/90* | (2023.01) |

(52) U.S. Cl.
CPC ............... *G06T 7/50* (2017.01); *H04N 23/56* (2023.01); *H04N 23/90* (2023.01); *G06T 2207/10024* (2013.01); *G06T 2207/10028* (2013.01); *G06T 2207/30161* (2013.01)

(58) Field of Classification Search
CPC ...... G06T 2207/30161; G01N 21/8806; G01N 21/8914; H04N 23/56; H04N 23/90
See application file for complete search history.

(56) References Cited

FOREIGN PATENT DOCUMENTS

| | | | | |
|---|---|---|---|---|
| JP | 2010008239 | A | * | 1/2010 |
| JP | 2012032271 | A | * | 2/2012 |
| JP | 2014222156 | A | | 11/2014 |
| JP | 2023029260 | A | | 3/2023 |

OTHER PUBLICATIONS

International Preliminary Report on Patentability issued on Jan. 28, 2025 for corresponding PCT Application No. PCT/JP2024/031552.

* cited by examiner 501            502

D1                            F1

D2                            F2

START

S1

ACQUIRE PLANAR COLOR IMAGES AND DEPTH
INFORMATION, AND ACQUIRE SHAPE INFORMATION

S2

No ◁ IS ACQUISITION OF INFORMATION
ON PLYWOOD COMPLETED? ▷

Yes

S3

CORRECT DEPTH INFORMATION
BASED ON SHAPE INFORMATION

S4

DETECT DEFECTS

END

DEFECT INSPECTION SYSTEM AND DEFECT INSPECTION METHOD

CROSS REFERENCE TO RELATED APPLICATIONS

This application is a National Phase filing under 35 U.S.C. § 371 of PCT/JP2024/031552 filed on Sep. 3, 2024; which application in turn claims priority to Application No. 2023-176670 filed in Japan on Oct. 12, 2023. The entire contents of each application are hereby incorporated by reference.

TECHNICAL FIELD

The present invention relates to a defect inspection system and a defect inspection method, and is particularly suitable for use in a system that detects defects existing in a plywood formed by laminating a plurality of veneers cut from a log.

BACKGROUND ART

Generally, a plywood is manufactured by superimposing a plurality of veneers, which are produced by cutting a log, which is a natural material, using a veneer lathe, and bonding the veneers together with an adhesive. A plywood produced from a log contains a variety of defects. Each plywood is sorted into one of a plurality of quality ranks depending on the type, size, number, or the like of the defects. Conventionally, a defect inspection apparatus that detects defects existing in a plywood is used to perform the sorting. Defects in the plywood that are detected by the defect inspection apparatus include discoloration (mold, dirt, bark inclusion, and the like), holes, contaminant, unevenness, warpage, bending, and the like of a face surface and a back surface.

Conventionally, an inspection apparatus that irradiates a face surface of a wood laminate with vertical irradiation light and oblique irradiation light and irradiates a back surface of the wood laminate with vertical irradiation light and oblique irradiation light and that determines the properties of each of the face surface and the back surface by analyzing image data obtained by capturing images of the face surface and the back surface of the wood laminate using line sensor cameras has been known (for example, refer to PTL 1).

In addition, among apparatuses that inspect the thickness of an object to be inspected such as a decorative board manufactured by affixing a plywood and a sheet-shaped decorative material together, an apparatus that inspects the thickness of the object to be inspected based on a difference between a plurality of first displacement data representing a distance from a position on one surface of the object to be inspected to a reference point set in advance, which is measured by one of a pair of displacement sensors disposed with the object to be inspected interposed therebetween, and a plurality of second displacement data representing a distance from a position on the other surface of the object to be inspected to the reference point, which is measured by the other displacement sensor, has also been known (for example, refer to PTL 2).

By the way, when capturing images of or measuring the face surface and the back surface of the plywood is simultaneously performed as in PTLs 1 and 2, it is necessary to separate conveying devices (conveyors) for conveying the plywood into an upstream side and a downstream side and to dispose the two conveyors with a spatial gap therebetween. Therefore, when the plywood is transferred from the upstream conveyor to the downstream conveyor, namely, when capturing images of or measuring the plywood is performed, the plywood may bounce and the influence of the bouncing may appear as an error in the captured or measured data. Particularly, when the plywood is warped or bent, the plywood is likely to bounce due to the warpage or bending.

Note that, in this regard, PTL 2 describes that a stripe pattern appears in a captured image due to vibrations of the object to be inspected that occur when the object to be inspected passes over an inspection surface of the displacement sensor, but an image in which a change in surface height caused by the vibrations of the object to be inspected is cancelled out can be acquired by taking the difference between the first displacement data and the second displacement data.

However, the technology described in PTL 2 is not for detecting defects in the plywood, but for measuring the thickness of the plywood. Therefore, when the technology described in PTL 2 is applied to a defect inspection apparatus for a plywood, in a case where a plywood has a defect such as warpage or bending, the defect is simultaneously removed by taking the difference between the first displacement data and the second displacement data, and a defect such as warpage or bending cannot be detected, which is a problem.

CITATION LIST

Patent Literature

PTL 1: JP2023-29260A
PTL 2: JP2014-222156A

SUMMARY OF INVENTION

Technical Problem

The invention has been made to solve such problems, and an object of the invention is to be able to accurately detect defects such as warpage or bending existing in a plywood.

Solution to Problem

In order to solve the above-described problems, in the invention, images of a face surface and a back surface of a plywood that is conveyed on conveyors are captured by imaging devices to generate depth information of both the surfaces of the plywood, a shape of the plywood in a board thickness direction is measured by a shape measurement device, which is provided at a location different from a location of the gap between the conveyors where the image capturing is performed, to generate shape information, and a defect in the plywood is detected by analyzing the depth information and the shape information. Here, the depth information is corrected based on the shape information, and then a defect in the plywood due to deformation is detected based on the depth information.

Advantageous Effects of Invention

In the invention configured as described above, the shape of the plywood in the board thickness direction that is measured at a location different from the location of the gap between the conveyors is a shape that is measured without being affected by vibrations that occur when the plywood is conveyed over the gap, and a defect in the plywood due to deformation is detected based on the depth information corrected based on the shape information. Accordingly, only errors in the depth information caused by the influence of vibrations that occur when the plywood is conveyed over the gap can be removed by correction based on the shape information, and a defect due to deformation such as warpage or bending occurring in the plywood can be accurately detected without the deformation such as warpage or bending being flattened by the correction of the depth information.

DESCRIPTION OF EMBODIMENTS

Figure 1:
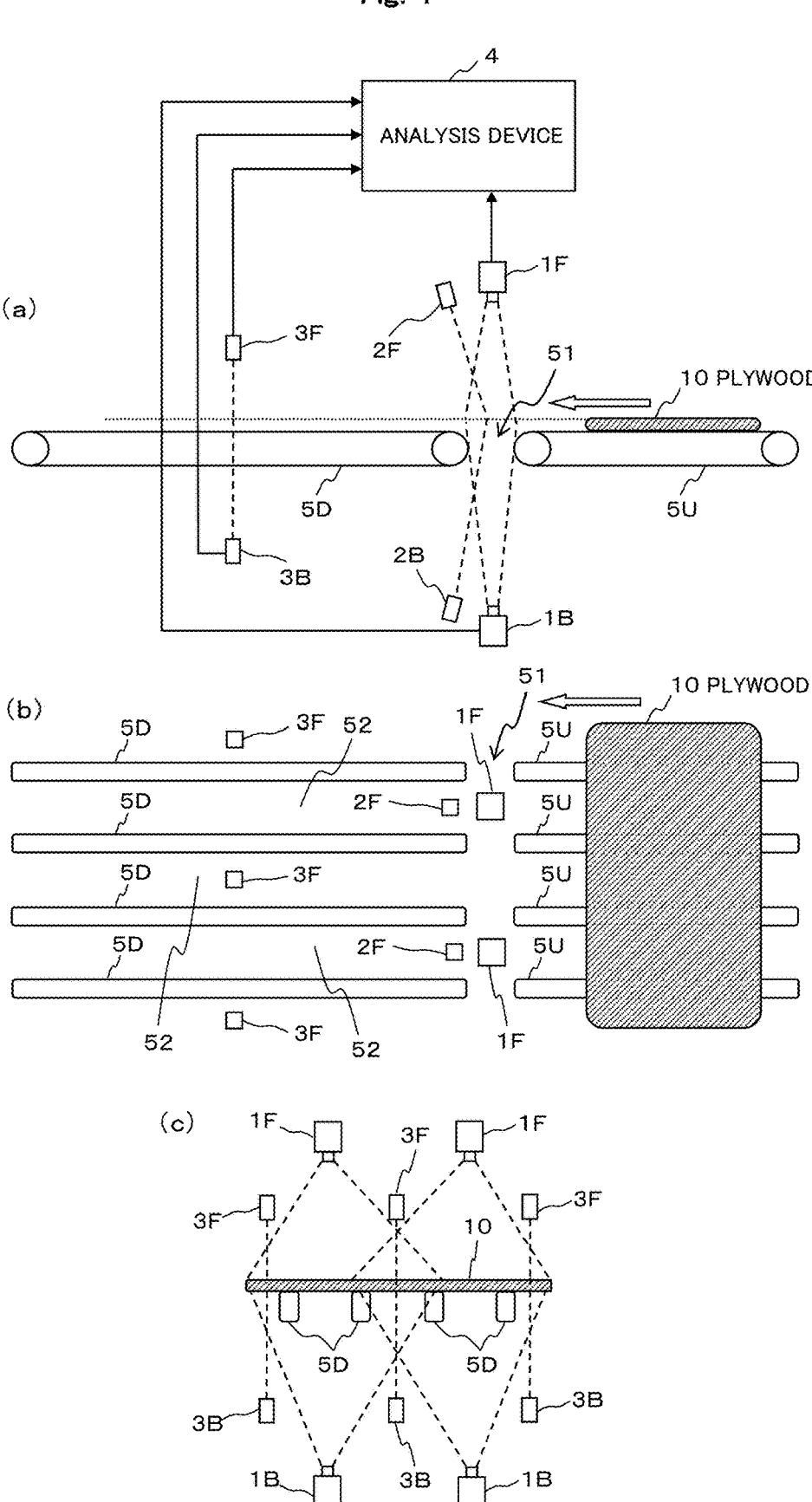
FIG. 1 is a view showing an overall configuration example of a defect inspection system according to the present embodiment.

Hereinafter, one embodiment of the invention will be described with reference to the drawings. FIG. 1 is a view showing an overall configuration example of a defect inspection system according to the present embodiment. FIG. 1(a) shows a state of the defect inspection system when viewed from the side, FIG. 1(b) shows a state of the defect inspection system when viewed from above, and FIG. 1(c) shows a state of the defect inspection system when viewed from a downstream side in a conveying direction. In FIGS.

1(a) and 1(b), the right side is an upstream side in the conveying direction, and the left side is the downstream side in the conveying direction.

As shown in FIG. 1, the defect inspection system of the present embodiment includes first illumination and imaging units 1F and 1B (may collectively be referred to as a first illumination and imaging unit 1), second illumination units 2F and 2B (may collectively be referred to as a second illumination unit 2), shape measurement units 3F and 3B (may collectively be referred to as a shape measurement unit 3), and an analysis device 4, and detects a plurality of types of defects existing in a plywood 10 that is conveyed by belt conveyors 5U and 5D (may collectively be referred to as a belt conveyor 5).

The belt conveyor 5 includes an upstream belt conveyor 5U and a downstream belt conveyor 5D, and the upstream belt conveyor 5U and the downstream belt conveyor 5D are disposed spaced apart from each other in the conveying direction. Therefore, a gap 51 exists between the two belt conveyors 5U and 5D in the conveying direction. In addition, as shown in FIG. 1(b), the belt conveyor 5 is configured by arranging a plurality of elongated belts in a width direction perpendicular to the conveying direction. Therefore, a plurality of gaps 52 also exist in the width direction. The plywood 10 is sequentially conveyed from the upstream belt conveyor 5U configured in such a manner to the downstream belt conveyor 5D.

Each of the first illumination and imaging units 1F and 1B includes a first illumination and an imaging device. The first illumination performs irradiation with a first illumination light for capturing a color image. The first illumination light can be composed of, for example, visible light such as white, blue, or green light. The first illumination and imaging units 1F and 1B are installed at positions vertically above and vertically below the gap 51 between the belt conveyors 5U and 5D, and vertically irradiates a face surface and a back surface of the plywood 10, which is located in the gap 51, with the first illumination light. Namely, the first illumination and imaging unit 1F installed above the gap 51 irradiates the face surface of the plywood 10, which is located in the gap 51, with the first illumination light. In addition, the first illumination and imaging unit 1B installed below the gap 51 irradiates the back surface of the plywood 10, which is located in the gap 51, with the first illumination light.

Each of the second illumination units 2F and 2B includes a second illumination. The second illumination performs irradiation with a second illumination light for acquiring depth information. The second illumination light can be composed of, for example, line-shaped laser light for light sectioning measurement, which has a color different from that of the first illumination light. The second illumination units 2F and 2B are installed downstream (may be upstream) of a center position of the gap 51 between the belt conveyors 5U and 5D in the conveying direction, and obliquely irradiate the face surface and the back surface of the plywood 10, which is located in the gap 51, with second illumination light. Namely, the second illumination unit 2F installed above the gap 51 obliquely irradiates the face surface of the plywood 10, which is located in the gap 51, with the second illumination light. In addition, the second illumination unit 2B installed below the gap 51 obliquely irradiates the back surface of the plywood 10, which is located in the gap 51, with the second illumination light.

As shown in FIGS. 1(b) and 1(c), the first illumination and imaging units 1F and 1B and the second illumination units 2F and 2B are installed in two sets in the width direction perpendicular to the conveying direction (the second illumination units 2F and 2B are not shown in FIG. 1(c)). Note that the number shown here is one example and may be one set or three or more sets. Accordingly, the entire region of the plywood 10 in the width direction can be irradiated with the first illumination light and the second illumination light without omission. Here, the plywood 10 is irradiated with the first illumination light for capturing a color image in a planar shape. Meanwhile, the plywood 10 is irradiated with the second illumination light for acquiring depth information in a line shape.

The imaging device included in the first illumination and imaging unit 1F on a face surface side of the plywood 10 and the imaging device included in the first illumination and imaging unit 1B on a back surface side of the plywood 10 are installed at positions that are vertically aligned in a straight line, and generate planar color images and depth information of the face surface and the back surface of the plywood 10 by simultaneously capturing images of the face surface and the back surface of the plywood 10, which is sequentially conveyed by the belt conveyors 5U and 5D, in the gap 51. Namely, the imaging devices generate planar color images and depth information by capturing images of the face surface and the back surface of the plywood 10 in the gap 51 in a state where the face surface and the back surface are irradiated with the first illumination light and the second illumination light. The depth information is information indicating a distance from a reference position to the face surface of the plywood 10 in a board thickness direction and a distance from the reference position to the back surface in the board thickness direction.

Namely, the imaging devices generate planar color image by receiving reflected light of the first illumination light and the second illumination light with which the plywood 10 is irradiated, and performing photoelectric conversion on the received light. The generated planar color images include a trajectory of the second illumination light with which irradiation is performed in a line shape. The imaging devices generate depth information by performing image processing on the line-shaped trajectory of the second illumination light included in the planar color images using a known light sectioning method. The imaging devices capture images of the plywood 10 at predetermined sampling times when the plywood 10 is conveyed on the belt conveyor 5, and sequentially output the planar color images and depth information, which are acquired thereby, to the analysis device 4.

Note that, here, a configuration example of the first illumination and imaging units 1F and 1B, in each of which the first illumination and the imaging device are integrally provided has been shown; however, the first illumination and the imaging device may be configured as separate members.

The shape measurement units 3F and 3B correspond to a shape measurement device in the claims, are installed at locations different from that of the gap 51 between the belt conveyors 5U and 5D in the conveying direction, and generate shape information by measuring the shape of the plywood 10 in the board thickness direction. In the example of FIG. 1, the shape measurement units 3F and 3B are installed at positions vertically above and vertically below the downstream belt conveyor 5D at a distance sufficiently away from the gap 51 toward a downstream belt conveyor 5D side. A position on the downstream belt conveyor 5D that is sufficiently away from the gap 51 is a position where the plywood 10 can be stably conveyed without being affected by bouncing in the gap 51.

The shape measurement units 3F and 3B include, for example, laser displacement sensors. The laser displacement sensors acquire, as shape information of the plywood 10, information indicating a distance from the same reference position as the depth information described above to the face surface of the plywood 10 in the board thickness direction and a distance from the same reference position to the back surface. Here, the shape measurement unit 3F installed above the downstream belt conveyor 5D measures the shape of the face surface of the plywood 10. In addition, the shape measurement unit 3B installed below the downstream belt conveyor 5D measures the shape of the back surface of the plywood 10.

As shown in FIGS. 1(b) and 1(c), the shape measurement units 3F and 3B are installed in a total of three sets, namely, one set at a position on each of both outer sides of the downstream belt conveyor 5D in the width direction and one set at the position of the gap 52 located at the center. Accordingly, the shape of the plywood 10 in the board thickness direction can be measured at a plurality of locations in the vicinities of both end portions and in a central portion of the plywood 10. Since the shape of the plywood 10 is measured at a position where the plywood 10 can be stably conveyed, the shape of the plywood 10 can be accurately measured at three locations where the shape measurement units 3F and 3B are installed, without being affected by the bouncing of the plywood 10 in the gap 51. Note that the number of the shape measurement units 3F and 3B shown here is one example and is not limited to three sets. For example, a total of five sets of the shape measurement units 3F and 3B may be installed by installing the shape measurement units 3F and 3B for each gap 52.

The analysis device 4 detects defects in the plywood 10 by analyzing the planar color images and depth information of the plywood 10 acquired by the imaging devices of the first illumination and imaging units 1F and 1B and the shape information of the plywood 10 acquired by the shape measurement units 3F and 3B. Here, the analysis device 4 detects a plurality of types of defects in the plywood 10, such as discoloration, holes, or unevenness, based on the planar color images, and detects defects in the plywood 10 due to deformation such as warpage or bending based on the depth information. At this time, the analysis device 4 corrects the depth information based on the depth information and the shape information.

Figure 2:
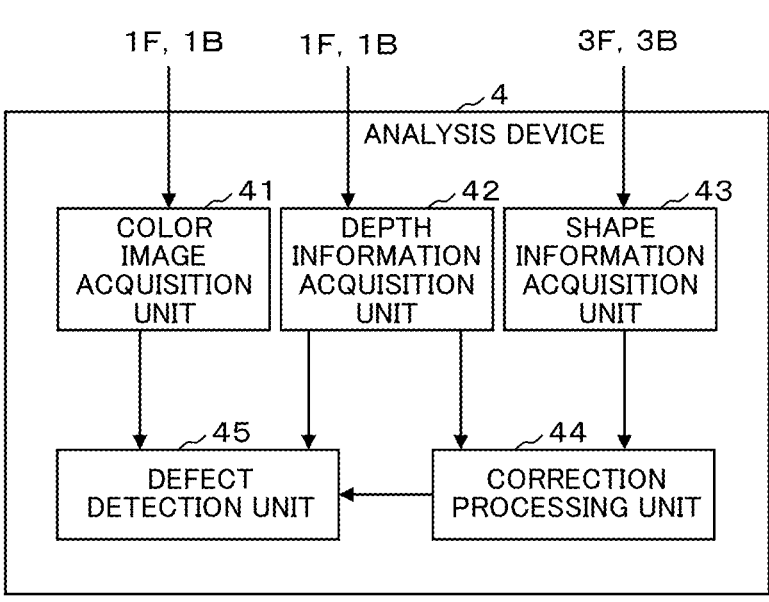
FIG. 2 is a block diagram showing a functional configuration example of an analysis device according to the present embodiment.

FIG. 2 is a block diagram showing a functional configuration example of the analysis device 4 according to the present embodiment. As shown in FIG. 2, the analysis device 4 of the present embodiment includes, as functional configurations, a color image acquisition unit 41, a depth information acquisition unit 42, a shape information acquisition unit 43, a correction processing unit 44, and a defect detection unit 45.

The functional blocks 41 to 45 execute processes to be described below through cooperation between hardware and software. For example, the processing of the functional blocks 41 to 45 is executed by operating a program stored in a RAM, a ROM, or a storage medium such as a hard disk or a semiconductor memory under the control of a microcomputer including a CPU, the RAM, the ROM, and the like. A digital signal processor (DSP) or the like may be provided in addition to the microcomputer.

The color image acquisition unit 41 acquires planar color images of the face surface and the back surface of the plywood 10 generated by the imaging devices of the first illumination and imaging units 1F and 1B. The depth information acquisition unit 42 acquires depth information of the face surface and the back surface of the plywood 10 generated by the imaging devices of the first illumination and imaging units 1F and 1B. As described above, the planar color images acquired by the color image acquisition unit 41 and the depth information acquired by the depth information acquisition unit 42 are generated by the imaging devices capturing images of the plywood 10 in the gap 51 in the conveying direction between the belt conveyors 5U and 5D.

FIG. 3 (FIGS. 3A to 3H) is a view schematically showing one example of depth information of the plywood 10 acquired by the depth information acquisition unit 42 (depth information generated by the imaging devices). Here, an example of depth information acquired during the process in which the plywood 10 that is warped is sequentially conveyed from the upstream belt conveyor 5U through the gap 51 to the downstream belt conveyor 5D is shown. The warpage refers to a state where the cross-sectional shape of the plywood 10 in the conveying direction is arched (arc shape) across the entirety of the plywood 10 in the width direction.

In FIG. 3, D1 is depth information of the face surface of the plywood 10, D2 is depth information of the back surface of the plywood 10, and both D1 and D2 indicate depth information at a specific location in the width direction of the plywood 10. Here, for the sake of description, the reference position for the depth information of the face surface and the back surface is assumed to be a position on the face surface when the plywood 10 is assumed to be flat over its entire surface (a position located above a face surface of the belt conveyor 5 by the thickness of the plywood 10).

Figure 3A:
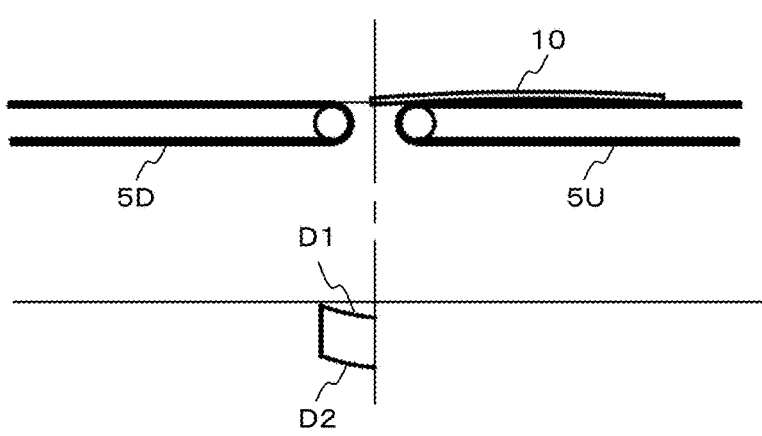
FIG. 3A is a view schematically showing one example of depth information of a plywood acquired by a depth information acquisition unit.
Figure 3B:
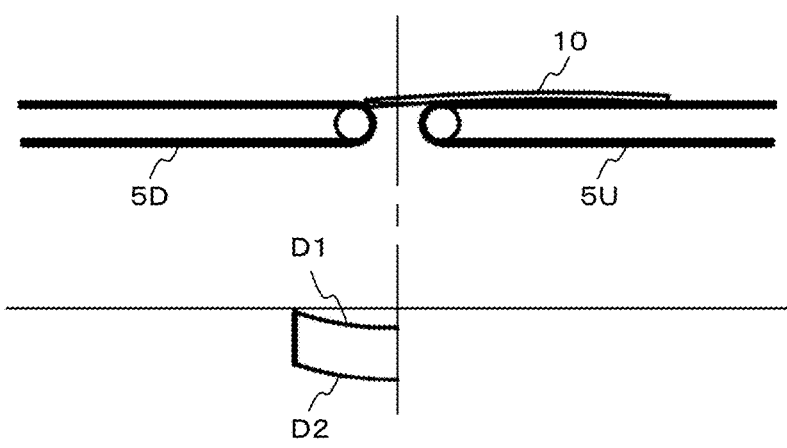
FIG. 3B is a view schematically showing one example of depth information of the plywood acquired by the depth information acquisition unit.

FIG. 3A shows a state where a leading end vicinity portion of the plywood 10 on the downstream side in the conveying direction is located in the gap 51 and the leading end vicinity portion is located lower than the reference position. For this reason, the depth information of the plywood 10 is acquired as information indicating a shape that is recessed downward from the reference position. The leading end vicinity portion of the plywood 10 continues to descend until a leading end of the plywood 10 lands on the downstream belt conveyor 5D as shown in FIG. 3B. For this reason, the depth information also continues to be recessed downward.

Figure 3C:
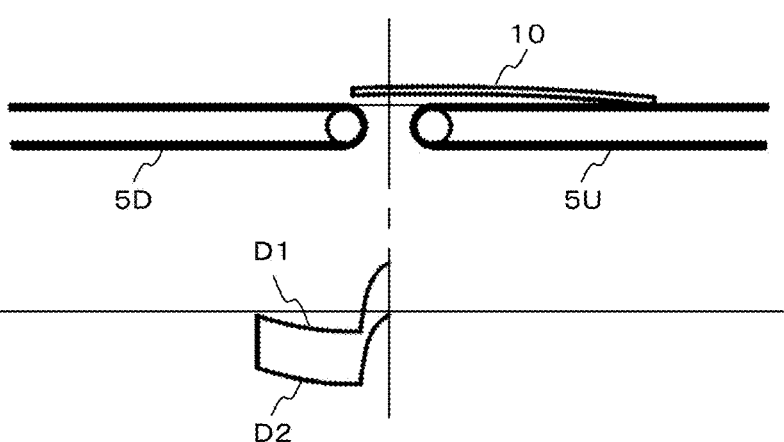
FIG. 3C is a view schematically showing one example of depth information of the plywood acquired by the depth information acquisition unit.
Figure 3D:
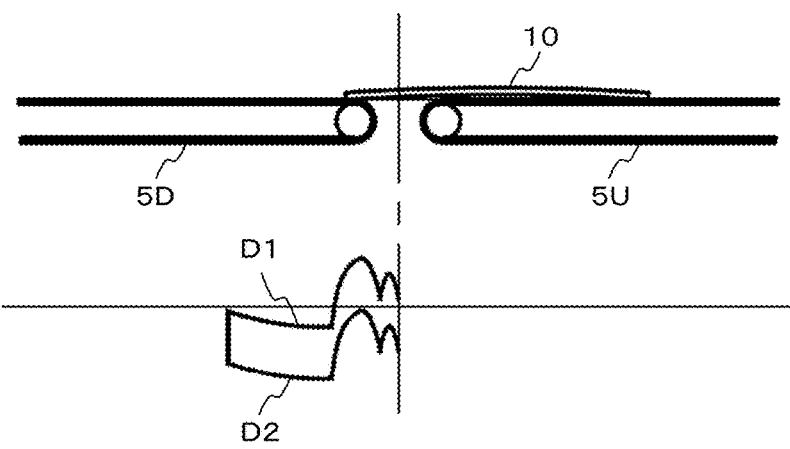
FIG. 3D is a view schematically showing one example of depth information of the plywood acquired by the depth information acquisition unit.
Figure 3E:
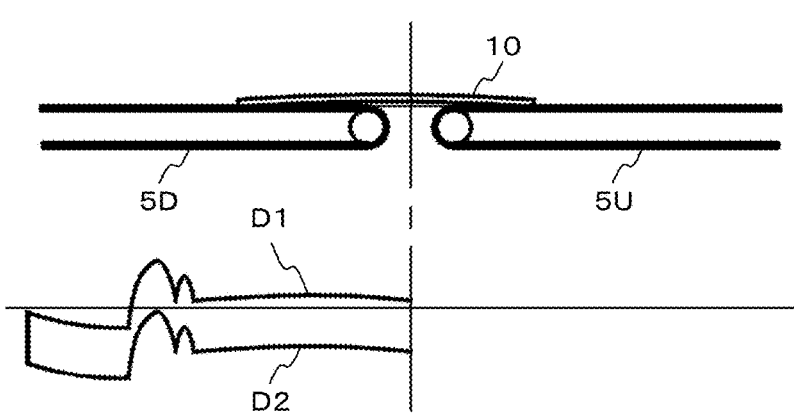
FIG. 3E is a view schematically showing one example of depth information of the plywood acquired by the depth information acquisition unit.

As shown in FIG. 3C, at the moment at which the leading end of the plywood 10 touches the downstream belt conveyor 5D, the plywood 10 bounces upward due to impact. Therefore, the depth information is also acquired as a shape protruding upward from the reference position. As shown in FIG. 3D, the plywood 10 may bound and bounce up multiple times. FIG. 3E shows depth information acquired at a position where the face surface of the plywood 10 is higher than the reference position due to warpage of the plywood 10 after the bounding has settled.

Figure 3F:
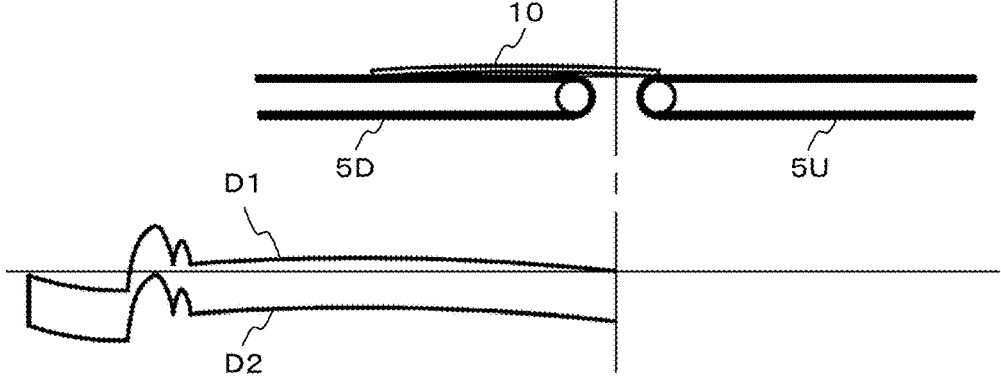
FIG. 3F is a view schematically showing one example of depth information of the plywood acquired by the depth information acquisition unit.
Figure 3G:
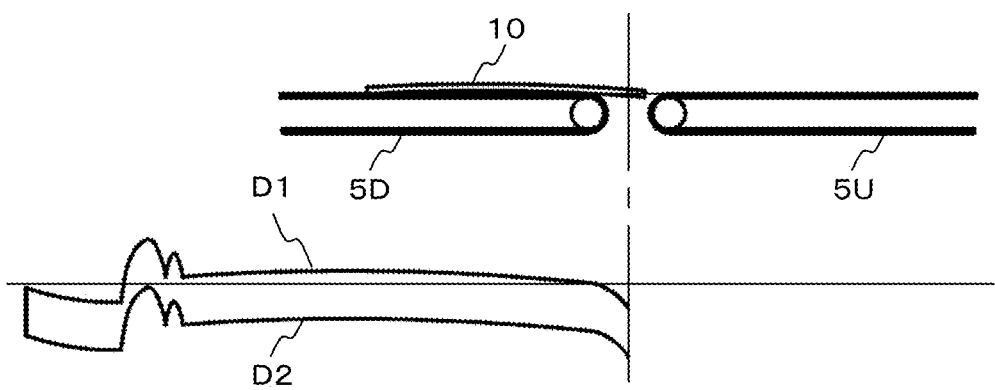
FIG. 3G is a view schematically showing one example of depth information of the plywood acquired by the depth information acquisition unit.
Figure 3H:
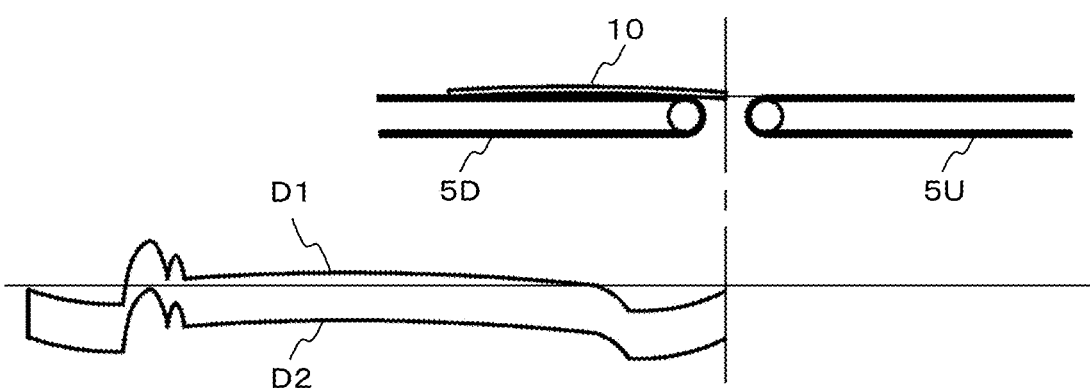
FIG. 3H is a view schematically showing one example of depth information of the plywood acquired by the depth information acquisition unit.

The plywood 10 is stably conveyed until a trailing end portion of the plywood 10 on the upstream side in the conveying direction falls into the gap 51, and depth information acquired during this period is as shown in FIG. 3F. FIG. 3G shows a state where a trailing end vicinity portion of the plywood 10 is located in the gap 51 and the trailing end vicinity portion is located lower than the reference position. For this reason, the depth information of the plywood 10 is acquired as information indicating a shape that is recessed downward from the reference position. At this point, the plywood 10 may also bounce slightly. Thereafter, the plywood 10 is conveyed while the trailing end vicinity portion is gradually raised upward along the overall warpage, thereby acquiring depth information as shown in FIG. 3H.

The shape information acquisition unit 43 acquires shape information of the face surface and the back surface of the plywood 10 generated by the shape measurement units 3F and 3B. As described above, the shape information acquired by the shape information acquisition unit 43 is measured by the laser displacement sensors irradiating the plywood 10 with laser light at a position sufficiently away from the gap 51 between the belt conveyors 5U and 5D in the conveying direction.

Figure 4:
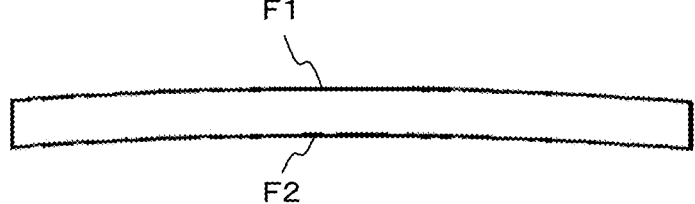
FIG. 4 is a view schematically showing one example of shape information of a plywood acquired by a shape information acquisition unit.

FIG. 4 is a view schematically showing one example of shape information of the plywood 10 acquired by the shape information acquisition unit 43 (shape information generated by the shape measurement units 3F and 3B). Here, an example of shape information acquired for the plywood 10 shown in FIG. 3 is shown. In FIG. 4, F1 is shape information of the face surface of the plywood 10, and F2 is shape information of the back surface of the plywood 10. The reference position for the shape information of the face surface and the back surface is assumed to be the same as the reference position for the depth information D1 and D2.

As described above, the shape measurement units 3F and 3B can accurately measure the shape of the plywood 10. Therefore, as shown in FIG. 4, the shape information acquired by the shape information acquisition unit 43 matches the actual shape of the plywood 10.

The correction processing unit 44 corrects the depth information acquired by the depth information acquisition unit 42, based on the shape information acquired by the shape information acquisition unit 43. For example, when the shape of the plywood 10 in the board thickness direction indicated by the depth information acquired by the imaging devices of the first illumination and imaging units 1F and 1B is different from the shape of the plywood 10 in the board thickness direction indicated by the shape information acquired by the laser displacement sensors of the shape measurement units 3F and 3B at the same position as the position where the depth information is acquired, the correction processing unit 44 corrects the depth information based on the shape information.

The fact that the position where the depth information is acquired is the same as the position where the shape information is acquired means that the position of the plywood 10 where an image is captured by the imaging devices in the gap 51 between the belt conveyors 5U and 5D is the same as the position of the plywood 10 measured after the plywood 10 is conveyed therefrom to the position of the shape measurement units 3F and 3B. The same position on the plywood 10 can be identified, for example, based on a conveyance distance from when an end portion of the plywood 10 is detected by the captured image. Alternatively, the same position can be identified from the conveyance distance from the first illumination and imaging units 1F and 1B to the shape measurement units 3F and 3B and the conveying speed of the belt conveyor 5.

Figure 5:
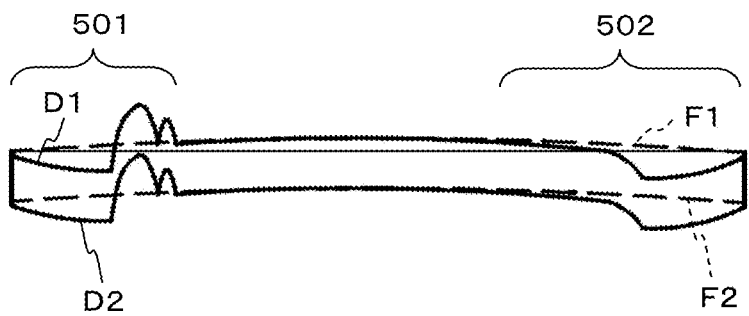
FIG. 5 is a view for describing processing contents of a correction processing unit.

The correction processing unit 44 calculates a difference value between the depth information and the shape information at the same position described above, and corrects the depth information by using the difference value as a correction value for the depth information. FIG. 5 is a view for describing processing contents of the correction processing unit 44. FIG. 5 shows a state where the depth information D1 and D2 generated by the first illumination and imaging units 1F and 1B as shown in FIG. 3 and the shape information F1 and F2 generated by the shape measurement units 3F and 3B as shown in FIG. 4 are superimposed such that the same positions correspond to each other.

In FIG. 5, a portion indicated by sign 501 indicates a period during which the leading end vicinity portion of the plywood 10 falls into the gap 51 and a period during which the plywood 10 bounces. In addition, a portion indicated by sign 502 indicates a period during which the trailing end vicinity portion of the plywood 10 falls into the gap 51. In the periods 501 and 502, the shape of the plywood 10 indicated by the depth information D1 and D2 does not match the exact shape of the plywood 10 indicated by the shape information F1 and F2. The correction processing unit 44 calculates, as a correction value, a difference value between the depth information D1 and D2 and the shape information F1 and F2 at a location where the shapes do not match, and corrects the depth information by adding the correction value to the depth information D1 and D2.

When correction is performed using such a method, the depth information D1 and D2 are corrected in such a manner that only the differences from the actual shape of the plywood 10 are removed without removing defects of the plywood 10, such as warpage or bending, through the correction. Accordingly, the corrected depth information accurately represents the shape of the plywood 10 similarly to the shape information F1 and F2 in FIG. 4.

Note that, here, when the shape of the plywood 10 indicated by the depth information D1 and D2 is different from the shape of the plywood 10 indicated by the shape information F1 and F2, the depth information D1 and D2 are corrected; however, the depth information D1 and D2 may be corrected without determining whether the shapes are different. In this case, for portions where the shape of the plywood 10 indicated by the depth information D1 and D2 is the same as the shape of the plywood 10 indicated by the shape information F1 and F2, correction is performed by setting the difference value between the depth information D1 and D2 and the shape information F1 and F2 to zero, which is substantially equivalent to correcting the depth information D1 and D2 only for portions where the shapes are different.

The defect detection unit 45 detects a plurality of types of defects in the plywood 10 based on the planar color images acquired by the color image acquisition unit 41. The plurality of types of defects detected based on the planar color images include discoloration (mold, dirt, bark inclusion, and the like), blind holes, loopholes, worm holes and beetle holes, contaminant inclusion, contaminant accumulation, and the like on the face surface and the back surface of the plywood 10. Note that these defects can be detected by applying a known technique, and detailed descriptions will be omitted.

Note that detecting a relatively gradual deformation in the shape of the plywood 10 such as warpage or bending by analyzing only the planar color images is difficult. A method for detecting warpage, bending, or the like by utilizing the shading of shadows cast by a plurality of illuminations can also be considered; however, since the difference in pixel values corresponding to the shadows may become small depending on the degree of unevenness and the angles of the illuminations, and shadows may not be generated at all depending on the angle of the unevenness, it is difficult to detect defects. Therefore, defects due to such deformation are detected based on the depth information.

The defect detection unit 45 detects defects in the plywood 10 due to deformation such as warpage or bending based on the depth information acquired by the depth information acquisition unit 42. Here, when the depth information is corrected by the correction processing unit 44, defects in the plywood 10 such as warpage or bending are detected based on the corrected depth information. As described above, the depth information is corrected by the correction processing unit 44, so that the corrected depth information accurately represents the shape of the plywood 10. Therefore, defects such as warpage or bending can be accurately detected.

Figure 6:
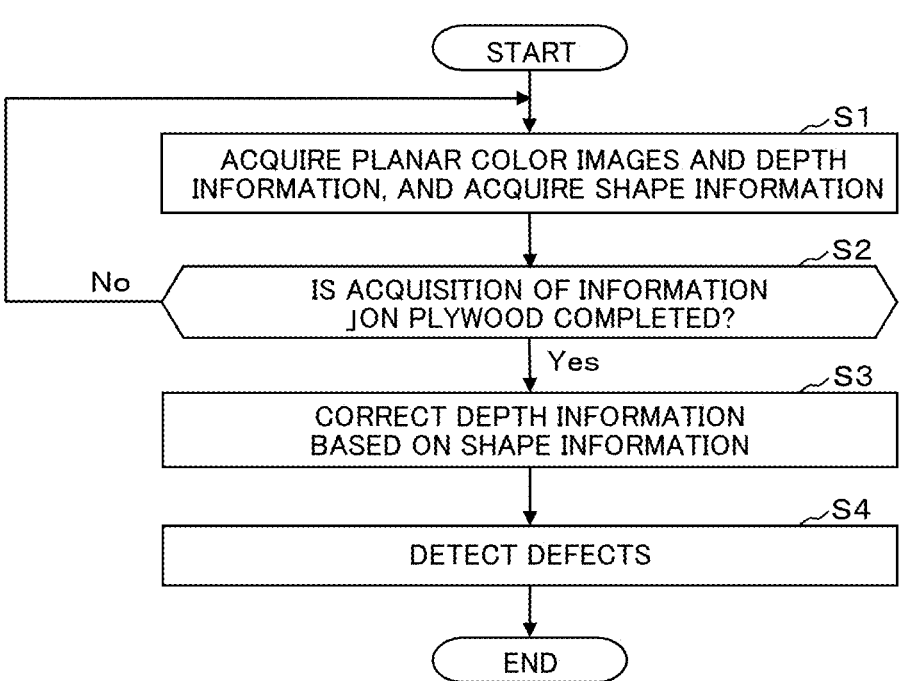
FIG. 6 is a flowchart showing an operation example of the analysis device according to the present embodiment.

FIG. 6 is a flowchart showing an operation example of the analysis device 4 configured as described above. FIG. 6 shows an operation example when the analysis device 4 detects the defects in one piece of the plywood 10.

In the loop process of steps S1 and S2, the color image acquisition unit 41, the depth information acquisition unit 42, and the shape information acquisition unit 43 acquire planar color images, depth information, and shape information for the entirety of the plywood 10 from the leading end to the trailing end. Namely, in step S1, the color image acquisition unit 41 and the depth information acquisition unit 42 sequentially acquire planar color images and depth information sequentially generated from the leading end toward the trailing end by the first illumination and imaging units 1F and 1B as the plywood 10 is conveyed, and the shape information acquisition unit 43 sequentially acquires shape information sequentially generated from the leading end toward the trailing end by the shape measurement units 3F and 3B as the plywood 10 is conveyed.

In step S2, it is determined whether the acquisition of the planar color images, the depth information, and the shape information of the entirety of the plywood 10 is completed, and when the acquisition is not completed, the process returns to step S1 and continues. Meanwhile, when it is determined that the acquisition of information on the entirety of the plywood 10 is completed, the correction processing unit 44 corrects the depth information based on the shape information (step S3). Then, the defect detection unit 45 detects a plurality of types of defects in the plywood 10 based on the color images, and detects defects in the plywood 10 due to deformations such as warpage or bending based on the corrected depth information (step S4). Accordingly, the process of the flowchart shown in FIG. 6 ends.

Note that, here, the flow in which the processing of the correction processing unit 44 and the defect detection unit 45 is executed after the processing of the first illumination and imaging units 1F and 1B and the shape measurement units 3F and 3B is completed for the entirety of the plywood 10 has been described; however, the invention is not limited thereto. For example, the processing of the correction processing unit 44 may also be sequentially executed while performing the processing of the first illumination and imaging units 1F and 1B and the shape measurement units 3F and 3B from the leading end toward the trailing end of the plywood 10, and after the processing is completed for the entirety of the plywood 10, the processing of the defect detection unit 45 may be performed.

As described in detail above, in the present embodiment, images of the face surface and the back surface of the plywood 10 that is conveyed on the belt conveyor 5 are captured by the first illumination and imaging units 1F and 1B to generate depth information of both the surfaces of the plywood, and the shape of the plywood 10 is measured by the shape measurement units 3F and 3B, which are installed at locations different from that of the gap 51 between the belt conveyors 5U and 5D where the image capturing is performed, to generate shape information. Furthermore, the depth information is corrected based on the shape information, and then defects in the plywood 10 due to deformation are detected based on the depth information.

The shape of the plywood 10 in the board thickness direction that is measured at a location different from that of the gap 51 between the belt conveyors 5U and 5D is a shape that is measured without being affected by vibrations that occur when the plywood 10 is conveyed over the gap 51, and defects in the plywood 10 due to deformation such as warpage or bending are detected based on the depth information corrected based on the shape information. Accordingly, only errors in the depth information caused by the influence of vibrations that occur when the plywood 10 is conveyed over the gap 51 can be removed by correction based on the shape information, and defects occurring in the plywood 10 due to deformation such as warpage or bending can be accurately defected without the deformation such as warpage or bending being flattened by the correction of the depth information.

Note that, in the embodiment, an example in which the laser displacement sensors installed above and below the belt conveyors 5U and 5D are used as one example of the shape measurement device that measures the shape of the plywood 10 at a location different from that of the gap 51 between the belt conveyors 5U and 5D has been described; however, the invention is not limited thereto. For example, instead of or in addition to the laser displacement sensors, a configuration including a side surface imaging device that generates image information of a side surface of the plywood 10 by capturing an image of the side surface may be implemented.

Figure 7:
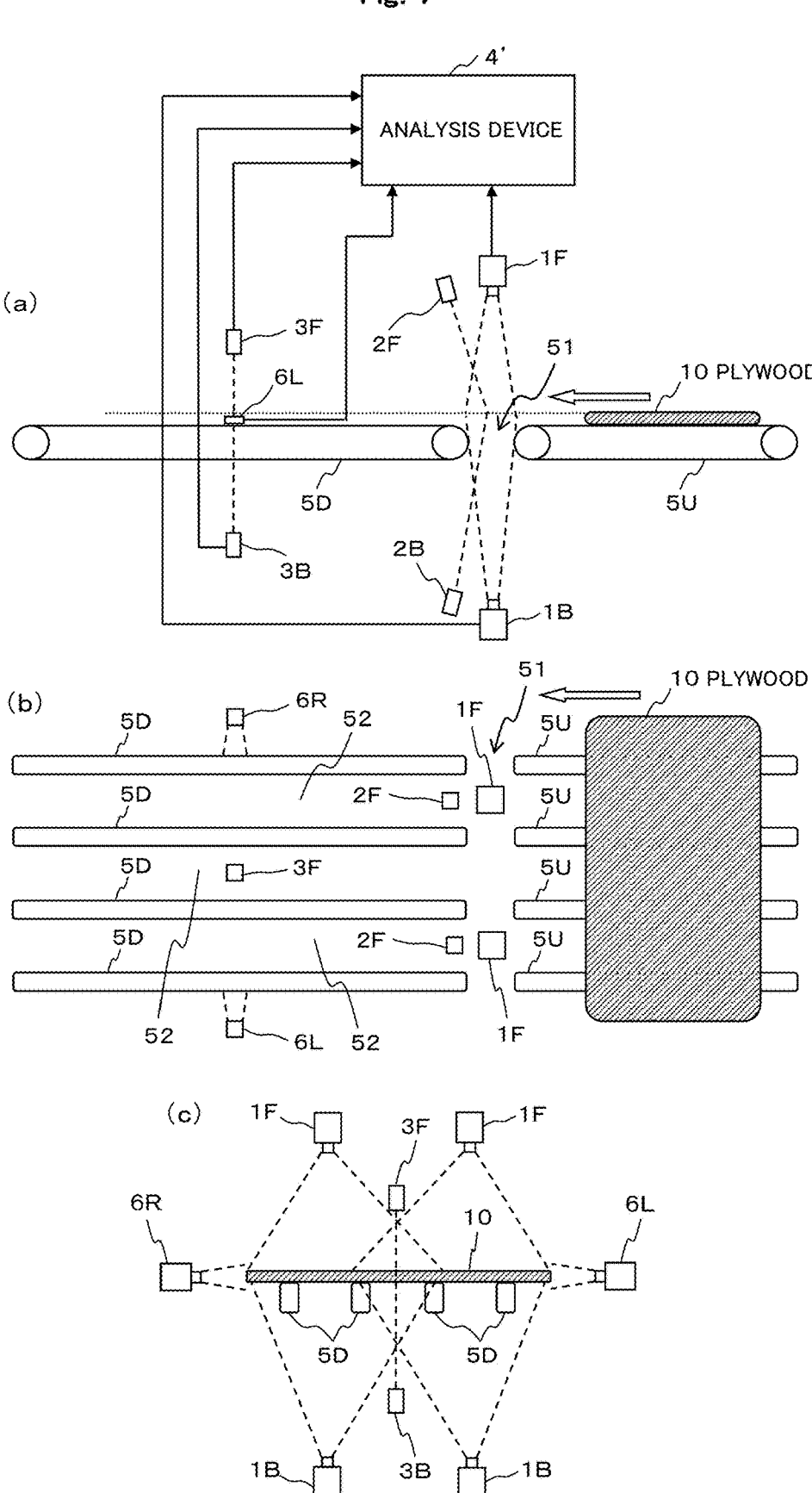
FIG. 7 is a view showing an overall configuration example of a defect inspection system according to a modification example.
Figure 8:
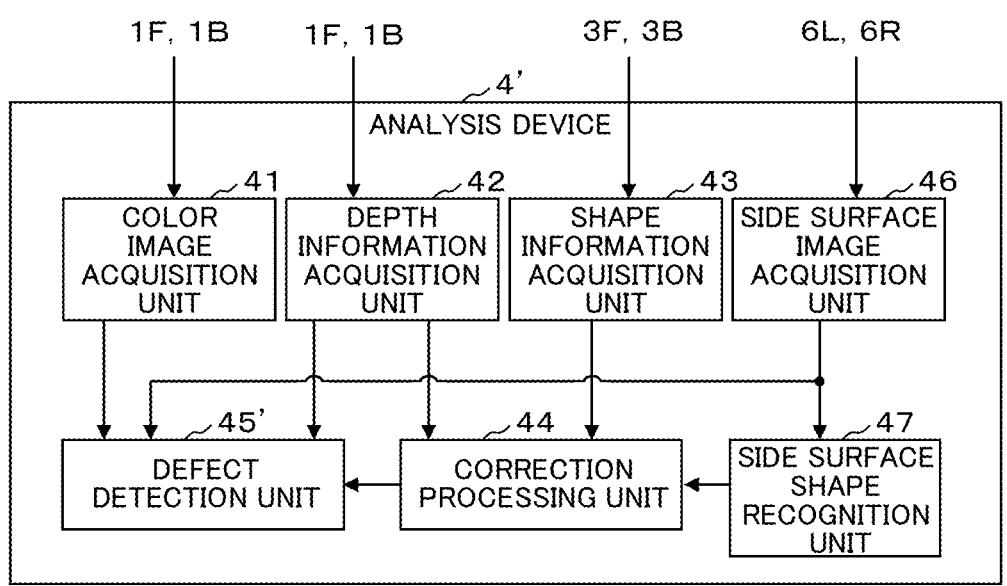
FIG. 8 is a block diagram showing a functional configuration example of an analysis device according to the modification example.

FIG. 7 is a view showing an overall configuration example of a defect inspection system according to a modification example. In addition, FIG. 8 is a block diagram showing a functional configuration example of an analysis device 4' in the defect inspection system according to the modification example. Note that, in FIGS. 7 and 8, components having the same functions as those of the components shown in FIGS. 1 and 2 are denoted by the same signs.

As shown in FIG. 7, the defect inspection system according to the modification example includes side surface imaging devices 6L and 6R on the left and right sides at a distance sufficiently away from the gap 51 toward the downstream belt conveyor 5D side. A distance from the gap 51 to the position where the side surface imaging devices 6L and 6R are installed is the same as a distance from the gap 51 to the position where the shape measurement units 3F and 3B are installed. As shown in FIGS. 7(b) and 7(c), in the defect inspection system according to the modification example, only one set of the shape measurement units 3F and 3B are provided at a center position of the downstream belt conveyor 5D in the width direction. Note that three or more sets may be provided similarly to FIG. 1.

As shown in FIG. 8, the analysis device 4' according to the modification example further includes a side surface image acquisition unit 46 and a side surface shape recognition unit 47 as functional configurations. In addition, the analysis device 4' includes a defect detection unit 45' instead of the defect detection unit 45. The side surface image acquisition unit 46 acquires side surface color images generated by the side surface imaging devices 6L and 6R. The side surface image acquisition unit 46 supplies the acquired side surface color images to the defect detection unit 45' and the side surface shape recognition unit 47.

The defect detection unit 45' detects defects existing on side surfaces of the plywood 10, based on the side surface color images acquired by the side surface image acquisition unit 46, in addition to detecting a plurality of types of defects existing on the face surface and the back surface of the plywood 10, based on the planar color images acquired by the color image acquisition unit 41.

The side surface shape recognition unit 47 generates shape information of the plywood 10 in the board thickness direction by analyzing the side surface color images acquired by the side surface image acquisition unit 46. The analysis performed here can be performed by applying a known image recognition process that detects the shape of an object from a captured image.

Shape information of left and right end portions of the plywood 10 in the board thickness direction can be obtained by analyzing the side surface color images captured by the left and right side surface imaging devices 6L and 6R, and shape information of a central portion of the plywood 10 in the board thickness direction can be obtained by the shape measurement units 3F and 3B. In addition, the left and right side surface imaging devices 6L and 6R can be used as both means for obtaining shape information of the left and right end portions of the plywood 10 in the board thickness direction and means for detecting defects existing on the side surfaces of the plywood 10.

Note that FIG. 7 shows an example in which the shape measurement units 3F and 3B and the side surface imaging devices 6L and 6R are installed at positions equidistant from the gap 51; however, installing the shape measurement units 3F and 3B and the side surface imaging devices 6L and 6R at the equidistant positions is not necessarily required.

In addition, in FIGS. 7 and 8, an example in which the side surface imaging devices 6L and 6R and the side surface shape recognition unit 47 of the analysis device 4' are provided as another example of the shape measurement device has been shown; however, the invention is not limited thereto. Namely, any means can be used as the shape measurement device as long as the means can measure the shape of the plywood 10 in the board thickness direction. For example, shape measurement by a light sectioning method may be used. Alternatively, a method in which the shape of the plywood 10 is measured using a contact type physical sensor may be used.

In addition, in the embodiment and the modification example, an example in which both the shape measurement units 3F and 3B and the side surface imaging devices 6L and 6R are installed on the downstream belt conveyor 5D side has been shown; however, one or both may be installed on an upstream belt conveyor 5U side.

In addition, the embodiment is merely one specific example of the implementation of the invention, and the technical scope of the invention should not be interpreted as being limited by the embodiment. Namely, the invention can be implemented in various forms without departing from the concept of the invention or main characteristics of the invention.

REFERENCE SIGNS LIST 1F, 1B: first illumination and imaging unit (imaging device)
2F, 2B: second illumination unit
3F, 3B: shape measurement unit (shape measurement device)
4, 4': analysis device
5U, 5D: belt conveyor
6L, 6R: side surface imaging device
41: color image acquisition unit
42: depth information acquisition unit
43: shape information acquisition unit
44: correction processing unit 45, 45': defect detection unit
46: side surface image acquisition unit
47: side surface shape recognition unit
51: gap

The invention claimed is:

1. A defect inspection system, characterized by comprising:

imaging devices that are disposed at positions vertically above and vertically below a gap between conveyors disposed spaced apart from each other in a conveying direction, that capture images of a face surface and a back surface of a plywood, which is sequentially conveyed by the conveyors, in the gap between the conveyors, and that generate depth information in a board thickness direction based on the captured images of the face surface and the back surface of the plywood;

a shape measurement device that generates shape information by measuring a shape in the board thickness direction at a location different from a location of the gap between the conveyors; and an analysis device that detects a defect of deformation in the plywood due to warpage or bending by analyzing the depth information acquired by the imaging devices and the shape information acquired by the shape measurement device, wherein the analysis device includes a correction processing unit that corrects the depth information based on the shape information, and a defect detection unit that detects a defect in the plywood due to deformation based on the depth information.

2. The defect inspection system according to claim 1, characterized in that the depth information and the shape information are information indicating a distance from a reference position to the face surface or the back surface of the plywood in the board thickness direction, and the correction processing unit calculates a difference value between the depth information and the shape information, and corrects the depth information by using the difference value as a correction value for the depth information.

3. The defect inspection system according to claim 1, characterized in that when a shape in the board thickness direction indicated by the depth information acquired by the imaging devices is different from the shape in the board thickness direction indicated by the shape information acquired by the shape measurement device at the same position as a position where the depth information is acquired, the correction processing unit corrects the depth information based on the shape information.

4. The defect inspection system according to claim 1, characterized in that the imaging devices are installed vertically above and vertically below the gap between the conveyors at positions that are vertically aligned in a straight line, and simultaneously capture the images of the face surface and the back surface of the plywood.

5. The defect inspection system according to claim 1, characterized by further comprising:

a first illumination that irradiates the face surface and the back surface of the plywood with a first illumination light for capturing a color image; and a second illumination that irradiates the face surface and the back surface of the plywood with a second illumination light for acquiring depth information, wherein the imaging devices generate planar color images and the depth information by capturing the images of the face surface and the back surface of the plywood in the gap between the conveyors in a state where the face surface and the back surface are irradiated with the first illumination light and the second illumination light, and the analysis device detects a plurality of types of defects in the plywood based on the planar color image, and detects a defect in the plywood due to deformation based on the depth information.

6. The defect inspection system according to claim 5, characterized in that the second illumination light is illumination light for light sectioning measurement.

7. The defect inspection system according to claim 1, characterized in that the shape measurement device includes a side surface imaging device that generates a side surface color image by capturing an image of a side surface of the plywood, and a side surface shape recognition unit included in the analysis device, and the side surface shape recognition unit generates shape information of the plywood in the board thickness direction by analyzing the side surface color image acquired by the side surface imaging device.

8. The defect inspection system according to claim 7, characterized in that the analysis device further detects a defect existing on the side surface of the plywood based on the side surface color image.

9. A defect inspection method, characterized by comprising:

a step of capturing images of a face surface and a back surface of a plywood, which is sequentially conveyed by conveyors disposed spaced apart from each other in a conveying direction, in a gap between the conveyors, using imaging devices disposed at positions vertically above and vertically below the gap between the conveyors, and generating depth information in a board thickness direction based on the captured images of the face surface and the back surface of the plywood;

a step of generating, by a shape measurement device, shape information by measuring a shape in the board thickness direction at a location different from a location of the gap between the conveyors; and a step of detecting, by an analysis device, a defect of deformation in the plywood due to warpage or bending by analyzing the depth information acquired by the imaging devices and the shape information acquired by the shape measurement device, wherein the step of detecting, by the analysis device, a defect in the plywood includes a first step of correcting, by a correction processing unit of the analysis device, the depth information based on the shape information, and a second step of detecting, by a defect detection unit of the analysis device, a defect in the plywood due to deformation based on the depth information corrected by the correction processing unit.

10. The defect inspection system according to claim 4, characterized by further comprising:

a first illumination that irradiates the face surface and the back surface of the plywood with a first illumination light for capturing a color image; and a second illumination that irradiates the face surface and the back surface of the plywood with a second illumination light for acquiring depth information, wherein the imaging devices generate planar color images and the depth information by capturing the images of the face surface and the back surface of the plywood in the gap between the conveyors in a state where the face surface and the back surface are irradiated with the first illumination light and the second illumination light, and the analysis device detects a plurality of types of defects in the plywood based on the planar color image, and detects a defect in the plywood due to deformation based on the depth information.

11. The defect inspection system according to claim 4, characterized in that the shape measurement device includes a side surface imaging device that generates a side surface color image by capturing an image of a side surface of the plywood, and a side surface shape recognition unit included in the analysis device, and the side surface shape recognition unit generates shape information of the plywood in the board thickness direction by analyzing the side surface color image acquired by the side surface imaging device.

\* \* \* \* \*